United States Patent
Hildebrand et al.

(10) Patent No.: US 7,850,044 B2
(45) Date of Patent: Dec. 14, 2010

(54) WELDED IN PLASTIC SPOUT PART

(75) Inventors: Detlef Hildebrand, Plettenberg (DE); Walter Schulte, Finnentrop (DE)

(73) Assignee: Georg Menshen GmbH & Co. KG, Finnentrop (DE)

(*) Notice: Subject to any disclaimer, the term of this patent is extended or adjusted under 35 U.S.C. 154(b) by 807 days.

(21) Appl. No.: 11/660,060

(22) PCT Filed: Oct. 25, 2005

(86) PCT No.: PCT/EP2005/011436
§ 371 (c)(1),
(2), (4) Date: Feb. 12, 2007

(87) PCT Pub. No.: WO2006/048154
PCT Pub. Date: May 11, 2006

(65) Prior Publication Data
US 2007/0205202 A1 Sep. 6, 2007

(30) Foreign Application Priority Data
Nov. 4, 2004 (DE) .............. 10 2004 053 857
Feb. 14, 2005 (DE) .............. 10 2005 006 871

(51) Int. Cl.
*B65D 75/58* (2006.01)
(52) U.S. Cl. .......... 222/107; 222/92; 222/566; 220/604; 220/613; 383/906
(58) Field of Classification Search .......... 222/92, 222/107, 566; 220/601, 613; 383/906; 493/189
See application file for complete search history.

(56) References Cited

U.S. PATENT DOCUMENTS

| 5,823,383 | A | | 10/1998 | Hins | |
|---|---|---|---|---|---|
| 5,873,491 | A | * | 2/1999 | Garcia et al. | 222/95 |
| 6,050,451 | A | * | 4/2000 | Hess et al. | 105/107 |
| 6,138,849 | A | * | 10/2000 | Roemer et al. | 215/48 |
| 6,612,466 | B1 | * | 9/2003 | Malin | 222/107 |
| 6,860,406 | B2 | * | 3/2005 | Kobetsky et al. | 222/107 |
| 6,991,140 | B2 | * | 1/2006 | Bourque et al. | 222/107 |
| 7,175,050 | B1 | * | 2/2007 | DeCottignies et al. | 222/95 |
| D566,554 | S | * | 4/2008 | Braukmann et al. | D9/453 |
| 2004/0094571 | A1 | * | 5/2004 | Rani | 222/92 |
| 2005/0029290 | A1 | * | 2/2005 | Lee | 222/92 |

* cited by examiner

*Primary Examiner*—Kenneth Bomberg
(74) *Attorney, Agent, or Firm*—Andrew Wilford

(57) ABSTRACT

The invention relates to a welded-in plastic spout part that is to be joined to a plastic receptacle part, especially a receptacle part made of film-type plastic material such as a pouch. The inventive spout part comprises parallel planar weld-on ribs which extend along the circumference of a neck area (spout) that defines a pouring passage. A rib-shaped welding burr that is less thick than the weld-on ribs is provided at the outer circumference of said weld-on ribs. The welding burr is molded onto an outer rounded peripheral edge of the weld-on ribs. A partition which protrudes radially on both sides of the neck area is arranged perpendicular to the weld-on ribs. Both ends of said partition extend beyond the ends of the rib base area so as to form lateral flaps. The welding burrs extend past both sides of the flaps while the lateral flaps are provided with one respective recess instead of a top and bottom outer corner.

14 Claims, 3 Drawing Sheets

WELDED IN PLASTIC SPOUT PART

CROSS REFERENCE TO RELATED APPLICATIONS

This application is the US national phase of PCT application PCT/EP2005/011436, filed 25 Oct. 2005, published 11 May 2006 as WO 2006/048154, and claiming the priority of German patent application 102004053857.3 itself filed 4 Nov. 2004 and German patent application 102005006871.5 itself filed 14 Feb. 2005.

FIELD OF THE INVENTION

The invention relates to a plastic weld-in spout for connection with a plastic receptacle, particularly a receptacle made of film-like plastic material, comprising parallel weld ribs extending from the outer surface of a neck area defining a pour passage, at the outer edge of which ribs a welding fin with a welding edge that is thinner than the rib base is provided, the welding fin being integrated with an outer rounded peripheral edge of the rib base and a partition that protrudes radially from both sides of the neck region and that is oriented perpendicular to the weld ribs.

BACKGROUND OF THE INVENTION

A weld-in spout of this kind is known from EP 0 773 893 A1 [U.S. Pat. No. 5,823,383]. In this familiar embodiment, the welding fins end at the outer ends of the weld ribs. The ends of the weld ribs and of the welding fins thus form a blended region that makes it difficult to tightly attach the pouch film by welding. So as to solve this problem, it is also known to form a tab on each of the outer ends of the weld ribs, which tabs form extensions of a partition that maintains the weld ribs at a distance. While these tabs at either end of the weld ribs improve the situation, relatively long welding times at high temperatures are still required to obtain a secure seal. This, however, results in a slight deformation of the film of the pouch due to the high temperature and welding time.

OBJECT OF THE INVENTION

It is the object of the invention to improve a plastic weld-in spout of the type described above such that a low temperature and short welding time are required, while achieving a high level of tightness, and that the plastic receptacle is not deformed after welding.

SUMMARY OF THE INVENTION

This object is achieved according to the invention in that both ends of the partition are extended beyond the ends of the rib base into lateral tabs, the welding fins extend beyond both sides of the tabs, and the lateral tabs each have a recess instead of upper and lower outer corners. As a result, welding can be done quickly and securely at low temperatures and with higher sealing reliability. In addition, typically only a single welding operation is required, instead of the existing two to four welding attempts. The upper and lower recesses on each tab prevent material of the tab from being unnecessarily forced inside the pouch and/or between the films during welding, thus ensuring a smooth transition with the pouch.

In the case of a plastic weld-in spout for connection with a plastic receptacle part, particularly a receptacle made of film-like plastic material such as a pouch, comprising parallel sheet-like weld ribs extending from the outer surface of a neck region (spout) defining a pour passage, at the outer edge of which ribs a welding fin that is thinner than the weld ribs is provided, the welding fin being integral with an outer rounded peripheral edge of the weld ribs, and a partition, which protrudes radially from both sides of the neck region, is disposed perpendicular to the weld ribs, it is proposed that both ends of the partition extend beyond the ends of the rib base to form lateral tabs, the welding fins extend beyond both sides of the tabs, and the lateral tabs comprise recesses instead of upper and lower outer edges. Here as well, the upper and lower recesses on each tab prevent material of the tab from being unnecessarily forced inside the pouch and/or between the films during welding, thus ensuring a smooth transition with the pouch.

A particularly reliable and continuous weld connection is achieved when the welding fin extends arcuately without a sharp corner to the tab at the outer end of the rib base. This is also improved when the welding fin tapers down on the tab in terms of height.

A reliable and continuous weld is also achieved when the welding fin decreases in its height from the end of the rib bases to the center of the rib bases. It is also proposed that the height of the welding fin is zero in the center region of the weld-in spout.

Optimal welding is also achieved when at least four rib bases are provided and only the center rib bases have welding fins. It is also advantageous when the tabs only protrude in the area of those rib bases that have welding fins.

Secure fastening with excellent sealing is achieved when the height of the lateral tabs is lower than the height of the walls. In addition, the tabs should be provided at the center of the walls.

In a preferred embodiment, one to three welding fins extend across the tabs. In addition, the welding fins may have an arcuate, sharp-edged, trapezoidal or rectangular cross-section.

So as to compensate for any deformation of the side walls during welding, it is proposed that lower welding fins have a larger cross-section and/or height than upper welding fins. Alternatively or additionally, it is proposed that it increases in width toward the bottom in its cross-section extending in particular through the neck region and/or spout axis. For this purpose, the walls may be flared toward the bottom.

So as to securely attach the walls of the receptacle, particularly a pouch, it is proposed that the walls in the upper regions thereof have parallel welding fins toward the neck region and/or spout axis.

BRIEF DESCRIPTION OF THE DRAWING

One illustrated embodiment of the invention is illustrated in a perspective diagram in the figures and will be explained in more detail hereinafter, where.

SPECIFIC DESCRIPTION

Figure 1:
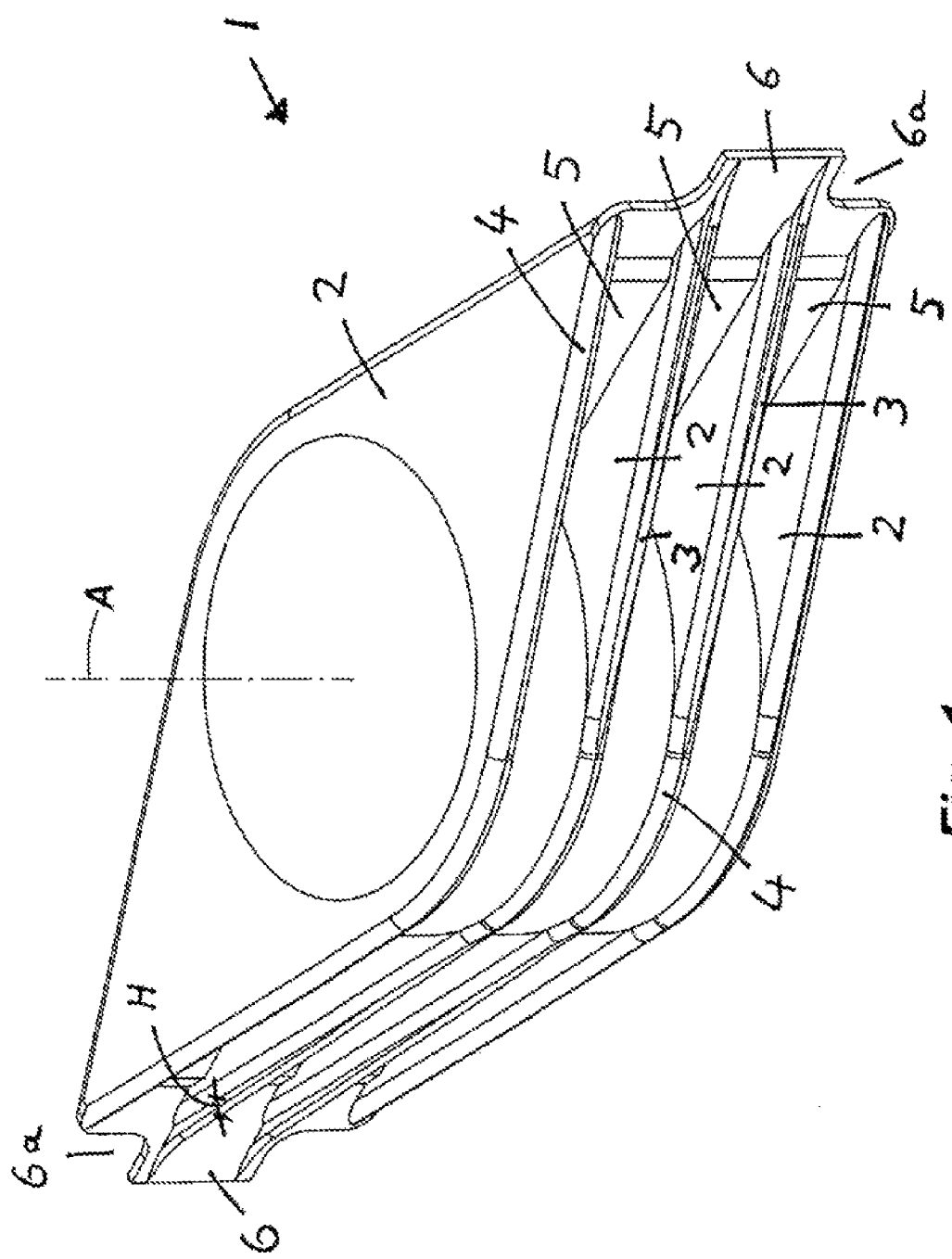
FIG. 1 is a perspective view of a first embodiment.
Figure 2:
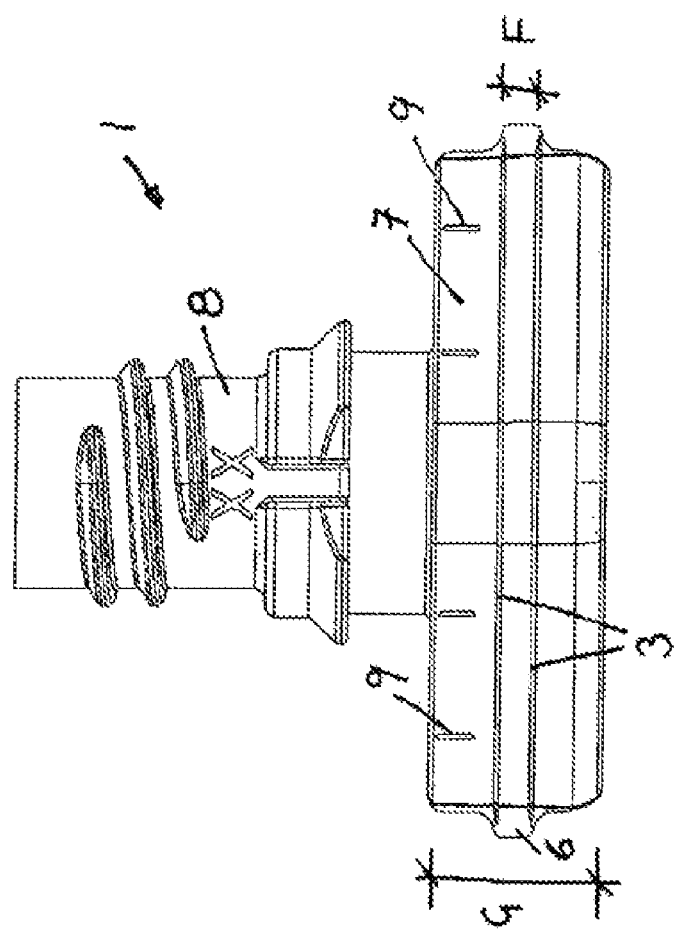
FIG. 2 is a first side view of a second embodiment.
Figure 3:
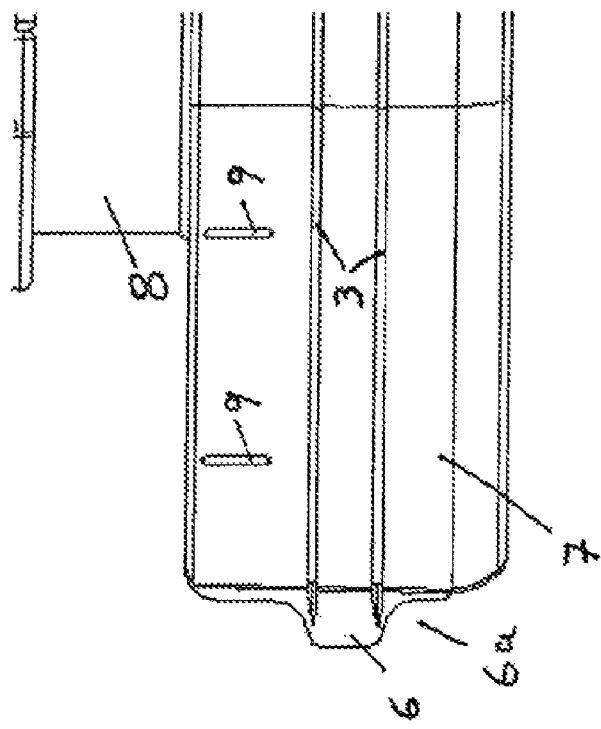
FIG. 3 is an enlarged section according to FIG. 2.
Figure 4:
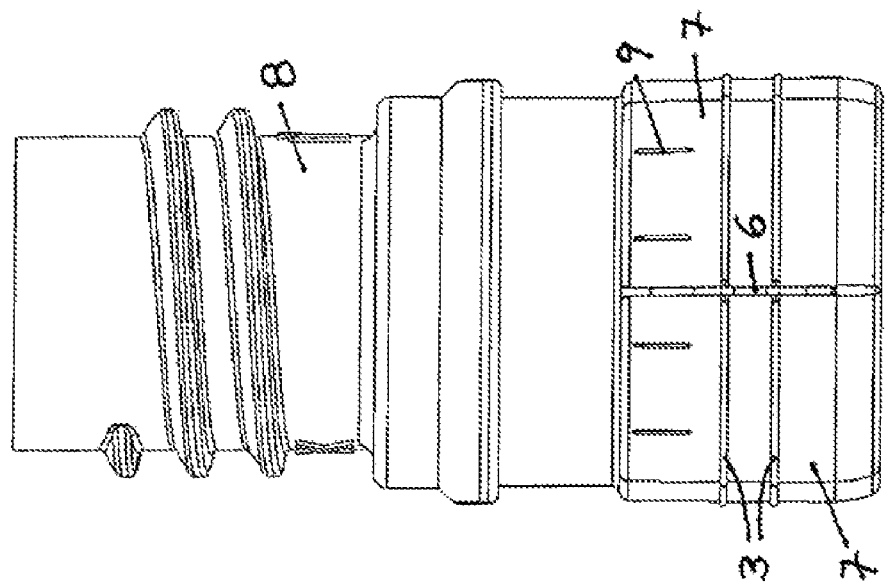
FIG. 4 is a second side view of the second embodiment.

A boat-shaped plastic weld-in spout 1 is molded in one piece from a dimensionally stable plastic material and in the first embodiment has four parallel, substantially rhombic walls that are uniformly spaced apart and are referred to hereinafter as "weld ribs 2." Each of these planar weld ribs 2 comprises a rib base on each of whose outer edges a thickened welding fin 3 is molded. These welding fins 3 therefore protrude from the rounded edges of the rib bases and are thinner than them. The welding fins 3, however, do not extend the entire length of the side or peripheral edges 4 of the weld ribs 2 (see FIG. 1), but only instead in a center region in which a central passage extends through all the weld ribs 2 along a spout axis A, the lateral edges and thus the outer edges of the weld ribs 2 being rounded and having no weld fin.

A center orifice 10 of the weld-in spout 1 is provided to receive the neck and/or spout 8 (see FIGS. 2-5) of a pour passage of a plastic spout not shown in FIG. 1.

The weld ribs 2 are held at a spacing from each other by a partition 5 that extends diametrically through the orifice at the axis A of the orifice 10. The partition 5 is therefore located on a radius of the orifice 10. The partition 5 ends in the region of the uppermost and lowermost weld ribs 2 at the outer ends thereof. In the region of the two center weld ribs 2, tabs 6 extend integrally from the partitions 5 in the same plane on either side, thus extending the weld-in spout 1 toward both ends.

The weld fins 3 of the two center weld ribs 2 are also extended and run across both sides of the tabs 6, at the end of which they also end.

In the region of the connecting area of the tab 6 to the partition 5, the weld fin 3 is arcuate, meaning it is not bent there, but rather fills out the bend between the lateral edge 4 of the weld rib 2 and the tab 6.

The height H of the weld fins 3 changes over their length, with the height being measured parallel to the faces of the is respective weld ribs 2. The height decreases from the outer ends of the rib bases 2 to the center, and in the center region of the rib base no weld fin is provided on the lateral edge 4, instead the height has decreased to zero.

The two tabs 6 are only provided in the region of the two center weld ribs 2. In the region of the upper and lower weld ribs there are recesses 6a.

In the second embodiment according to FIGS. 2 to 5, the boat-shaped weld-in spout has instead of the weld ribs 2, or also in addition to them, outer walls and/or walls 7 that form the side walls of the boat shape and extend generally vertical. In this embodiment, the neck region and/or spout 8 also form the pour passage and pour orifice, and a cap with an internal thread can be screwed onto an external thread of the spout.

The two outer convex side walls 7 thus enclose the pour passage and are attached to each other at their ends or are molded to each other from plastic as one piece. Extensions in the form of tabs 6 are molded onto both ends of the walls 7, the height of which extensions being only one-quarter to one-third of the height of the walls 7, so that here as well as in the first embodiment clear recesses 6a exist above and beneath each tab 6.

Weld fins 3 extend on both lateral walls 7 across the entire length of the walls and parallel to the upper and lower surfaces. The weld fins 3 extend beyond both ends of the walls 7 on the tabs 6, where they taper down in height, as is the case in the first embodiment.

The tabs 6 are therefore provided in the center of the walls 7 and two weld fins 3 run across the tabs in the embodiment. Instead, it is also possible to provide one or three weld fins parallel to each other. The cross-section of the weld fins may be semicircular, sharp-edged, trapezoidal or rectangular.

Figure 5:
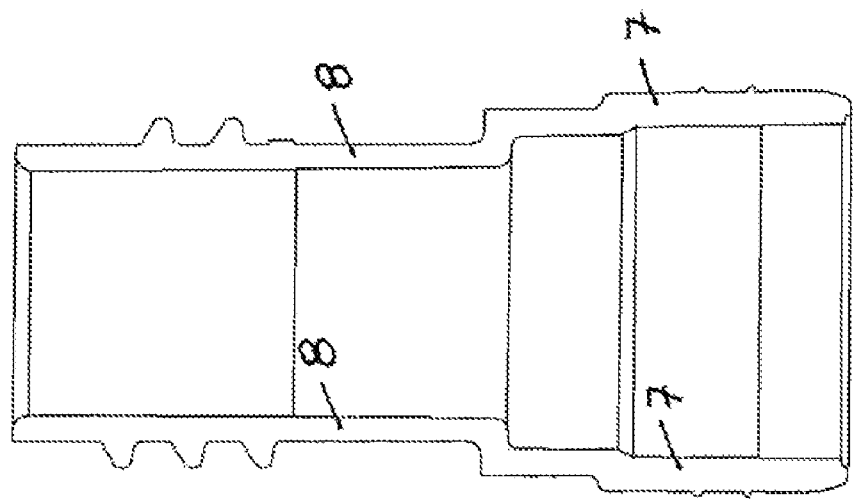
FIG. 5 is a vertical axial section of the second embodiment.

So as to be able to securely attach the walls of the receptacle, particularly the film walls of a pouch, on the boat-shaped region of the weld-in spout and to take into consideration that the walls will yield when pressing the receptacle walls against the weld-in spout, it is advantageous if weld fins located further down have a larger cross-section and/or height H than weld fins in upper regions that so that the lower weld fins or the lower weld fin of the pouch wall accommodates the process and compensates for yielding and/or pressing. In addition or instead, however, the walls 7 may also be flared toward the bottom, so that the cross-section of the boat shape increases toward the bottom, as is shown in FIG. 5.

Secure fastening of the upper edge of the receptacle wall and/or of the receptacle film is achieved in that perpendicular weld fins 9 protruding to the outside are provided above the uppermost weld fin 3 on the walls 7, which fins may extend to the upper edge of the surface 7.

The results are:
reduction of the welding temperature from 220° C. to 195° C., thus reducing the delaminating risk of the film
reduction of the welding time from 1 sec to 0.5 sec.
concentration of the welding zone to 2 to 3 ribs
only 1 welding operation (today up to 4)
better appearance in the welding region after welding and nicer welding zone on the finished pouch.

The invention claimed is:

1. A weld-in spout for mounting in a plastic pouch made of plastic film, the spout comprising:
a plurality of substantially planar and generally rhombic plastic ribs extending spacedly parallel to one another, defining a central orifice centered on an axis generally perpendicular to the ribs, and having an outer edge, the ribs including at least two center ribs and two end ribs axially flanking the center ribs;
respective thick weld fins adapted to be bonded to the film of the pouch and each extending along at least a portion of a respective one of the outer edges; and
a partition extending generally diametrically from the orifice and lying in a plane including the axis, the partition being joined to the ribs and having opposite ends formed with tabs projecting outward past the center ribs and forming recesses at the end ribs, the weld fins of the center ribs extending onto the tabs.

2. The weld-in spout according to claim 1, wherein in upper regions the ribs have weld fins that are parallel to the neck or spout axis.

3. The weld-in spout according to claim 1, wherein the weld fins at outer ends of the ribs extend arcuately without bends toward the tabs.

4. The weld-in spout according to claim 1, wherein the weld fins taper down on the tabs in terms of height.

5. The weld-in spout according to claim 4, wherein a height of the weld fins in a center region of the weld-in spout is zero.

6. The weld-in spout according to claim 1, wherein the weld fins decrease in height from ends of the ribs or the partition toward a center of the partition.

7. The weld-in spout according to claim 1, wherein a height of the weld fins is the same along their full length.

8. The weld-in spout according to claim 1, wherein lower weld fins have larger cross-sections or heights than upper weld fins.

9. The weld-in spout according to claim 1, wherein the tabs only project in the area of those ribs that have weld fins.

10. The weld-in spout according to claim 1, wherein a height of the tabs is less than the height of the partition.

11. The weld-in spout according to claim 1, wherein one to three weld fins extend across the tabs.

12. The weld-in spout according to claim 1, wherein the weld fins have an arcuate, sharp-edged, trapezoidal or rectangular cross-section.

13. The weld-in spout according to claim 1, wherein the orifice increases in cross section toward the bottom along the axis.

14. The weld-in spout according to claim 13, wherein the orifice is flared toward the bottom.

* * * * *